US007383026B1

(12) United States Patent
Detch et al.

(10) Patent No.: US 7,383,026 B1
(45) Date of Patent: Jun. 3, 2008

(54) WIDEBAND RETROREFLECTOR

(75) Inventors: John Lewis Detch, Severna Park, MD (US); Hugh Warren Schwartz, Glen Burnie, MD (US)

(73) Assignee: The United States of America as represented by the Nation Security Agency, Washington, DC (US)

( * ) Notice: Subject to any disclaimer, the term of this patent is extended or adjusted under 35 U.S.C. 154(b) by 466 days.

(21) Appl. No.: 11/254,119

(22) Filed: Oct. 17, 2005

(51) Int. Cl.
*H04B 7/00* (2006.01)

(52) U.S. Cl. ...................... 455/106; 455/118; 340/10.1

(58) Field of Classification Search ..................... None
See application file for complete search history.

(56) References Cited

U.S. PATENT DOCUMENTS 5,073,900 A 12/1991 Mallinckrodt
5,339,330 A 8/1994 Mallinckrodt
5,603,098 A 2/1997 Kwan
5,819,164 A 10/1998 Sun et al.
6,456,668 B1 9/2002 MacLellan et al.
6,838,989 B1 * 1/2005 Mays et al. .............. 340/572.1
7,277,681 B2 * 10/2007 Saito .......................... 455/108

* cited by examiner

*Primary Examiner*—Thanh C Le
(74) *Attorney, Agent, or Firm*—Eric Froehlich

(57) ABSTRACT

A novel single wideband retroreflector is disclosed that eliminates the need for a local oscillator and a local transmitter. The wideband retroreflector of the present invention comprises an antenna, a circulator, and a mixer. An externally produced continuous wave radio wave transmission within the microwave-millimeter wave frequency band is modulated with a wideband signal with a minimum operating instantaneous bandwidth of 5 KHz-500 MHz and retransmitted as a modulated waveform by the antenna.

10 Claims, 4 Drawing Sheets

WIDEBAND RETROREFLECTOR

FIELD OF THE INVENTION

The present invention relates, in general, to telecommunications, and, in particular to a retroreflector with feedback of modulated output signals.

BACKGROUND OF THE INVENTION

There are many known methods of retransmitting radio wave signals intra-building and inter-building as well as ground to aircraft or ground to satellite. Some techniques modulate the reflection coefficient of an antenna. Prior art designs have used frequency multiplication or field effect transistor (FET) mixing to modulate the reflection coefficient of an antenna and therefore the reflected amount of incident power to perform this function. This method is limited by its instantaneous bandwidth to about 50 MHz and its overall efficiency in addition to the tendency to produce large amounts of harmonics.

As shown in FIG. 1, in this method, a pin diode or FET 10 is connected to the transmission line port of an antenna 12. The reflectivity is controlled by a signal bias 14. The gate voltage changes the reflection coefficient of the drain, so a varying level of power is reflected from the antenna.

Other techniques include optical retroreflectors and RFID transponders. Optical retroreflectors reflect the illuminating energy. RFID transponders use a fixed RF frequency with resonant circuits.

U.S. Pat. Nos. 5,073,900 and 5,339,330, both entitled "INTEGRATED CELLULAR COMMUNICATIONS SYSTEM" disclose a cellular communications system having fully integrated surface and space nodes. A spread spectrum communications method is used to increase the number of users that are accommodated within the spectrum. High gain antennas are used to keep power requirements at the mobile handsets to a minimum, reducing the need for power at the transmitter, but not the local transmitter itself. The present invention is not limited in this regard. U.S. Pat. Nos. 5,073,900 and 5,339,330 are hereby incorporated by reference into the specification of the present invention.

U.S. Pat. No. 5,603,098 entitled "INTEGRATED RADIATING AND COUPLING DEVICE FOR DUPLEX COMMUNICATIONS," discloses a radiating and coupling device having an antenna, a circulator, a receiver section, an input/output device section, and a transmitter section. A transmitter section is required to retransmit the signal. The present invention is not limited in this regard. U.S. Pat. No. 5,603,098 is hereby incorporated by reference into the specification of the present invention.

U.S. Pat. No. 5,819,164 entitled "MODULATED RETROREFLECTION SYSTEM FOR SECURE COMMUNICATION AND IDENTIFICATION," discloses a transponder that receives, modulates, and reflects a signal back to a transceiver. The transceiver comprises a frequency source oscillator connected to a bi-directional antenna through a circulator, and a mixer detector. An interrogation signal is generated by the oscillator and transmitted by the antenna to the transponder. The transponder reflects the signal back, where it is received by the antenna and fed into the mixer detector. A local oscillator is required. The present invention is not limited in this regard. U.S. Pat. No. 5,819,164 is hereby incorporated by reference into the specification of the present invention.

U.S. Pat. No. 6,456,668 entitled "QPSK MODULATED BACKSCATTER SYSTEM," discloses a method of using quadrature phase shift keying to modulate radio signal. One antenna is used to receive a signal, which is amplified and modulated using a sub-carrier. The modulated signal is then retransmitted using a second antenna. A circulator could be used to separate the received signal from the retransmitted signal in applications where one antenna is used. The disclosed method requires a local transmitter to retransmit the modulated signal. The present invention is not limited in this regard. U.S. Pat. No. 6,456,668 is hereby incorporated by reference into the specification of the present invention.

There exists a need for a retroreflector that eliminates the power requirements of a local oscillator and does not suffer the limitations on switching speed of non-linear junctions that limit instantaneous bandwidth common in prior art designs.

SUMMARY OF THE INVENTION

It is an object of the present invention to transfer data by the illumination of the retroreflector with a continuous wave of RF energy, where the retroreflector both modulates the incoming signal and retransmits it using the incoming signal energy.

The wideband retroreflector according to the present invention includes an antenna, a circulator, and a mixer.

The antenna receives and transmits radio wave signals, and has a physical port connected to the circulator.

The circulator has three physical ports. The first port is connected to the output of the antenna. Signals received at port one of the circulator are preferentially routed to port two. Signals received at ports two and three are similarly routed to the next port.

A mixer has three physical ports, the radiofrequency (RF), local oscillator (LO) and intermediate frequency (IF). The mixer LO port is connected to the second port of the circulator, and receives the radio wave signal from the antenna. A user-definable input signal is received at the intermediate frequency port of the mixer. The user-definable input signal modulates the received radio signal. The modulated signal is re-transmitted to the antenna by a connection from the output of the mixer that is connected to the third port of the circulator.

In an alternate embodiment an amplifier is used to amplify the received radio wave signal before the radio wave signal is applied to the mixer.

DETAILED DESCRIPTION

The present invention comprises a novel wideband retroreflector that receives an externally produced continuous wave radio wave transmission, modulates it with a wideband signal, and retransmits a modulated waveform.

Figure 1:
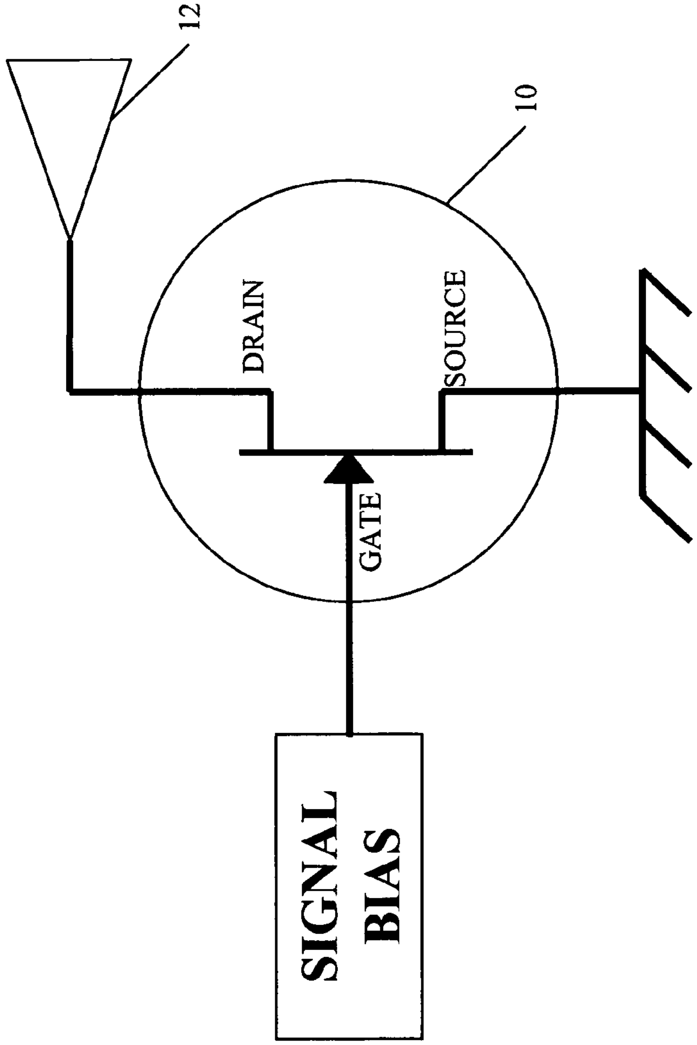
PRIOR ART Fig. 1
FIG. 1 is a schematic of the prior art.
Figure 2:
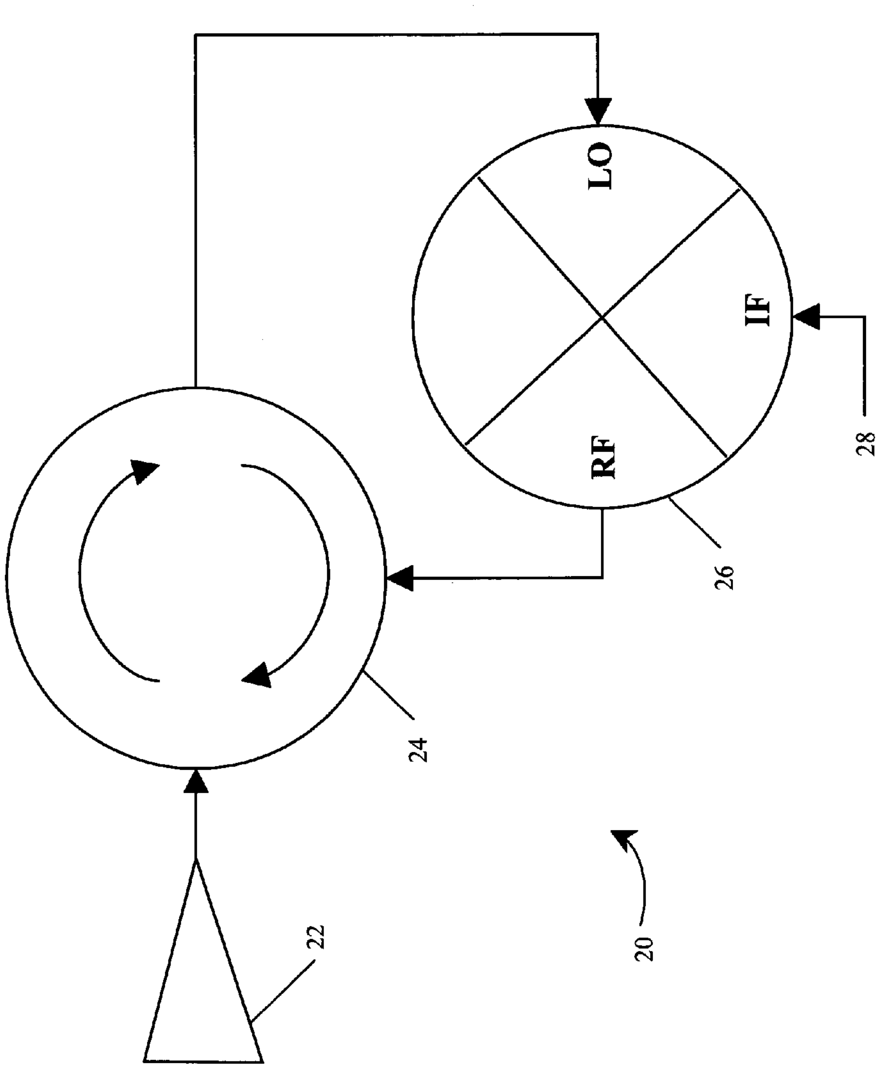
FIG. 2 is a schematic of the present invention.

Referring to FIG. 2, a wideband retroreflector circuit 20 according to the present invention is shown. The wideband retroreflector circuit 20 has an antenna 22, a circulator 24, a mixer 26, and a user-definable input signal 28.

The antenna 22 receives an externally produced continuous wave radio wave transmission. The frequency range over which this system can operate covers the microwave-millimeter wave region of the radio spectrum. Antenna 22 also has a transmission line port, or output, wherein the received signal is accessible for further processing.

A circulator 24 has a first port, a second port, and a third port. The first port is electrically connected to the output the antenna 22. The circulator 24 used in the present invention is a three-port ferrite circulator commonly available in the commercial market.

A mixer 26 has three ports, a local oscillator port (LO), an intermediate frequency port (IF), and the radiofrequency port (RF). The LO port is electrically connected to the second port of the circulator 24. The IF port is electrically connected to a user-definable input signal 28, and the RF port is electrically connected to the third port of the circulator 24.

Those persons skilled in the art will recognize that the mixer 26 may be biased by an external power supply.

The user-definable input signal 28 modulates the received wideband radio wave signal. The modulated waveform is then retransmitted through the antenna.

In the present invention, the mixing of the incoming RF power is a substitute for a local oscillator and the preferential power routing of a three-port ferrite circulator 24 functions without running into the inherent limits on switching speed of non-linear junctions that limits instantaneous bandwidth. It is the three-port circulator 24 that routes the incoming power to the mixers 26 local oscillator port and at the same time routes the RF output that contains the sum and difference frequency components out to be transmitted through the antenna 22.

Figure 3:
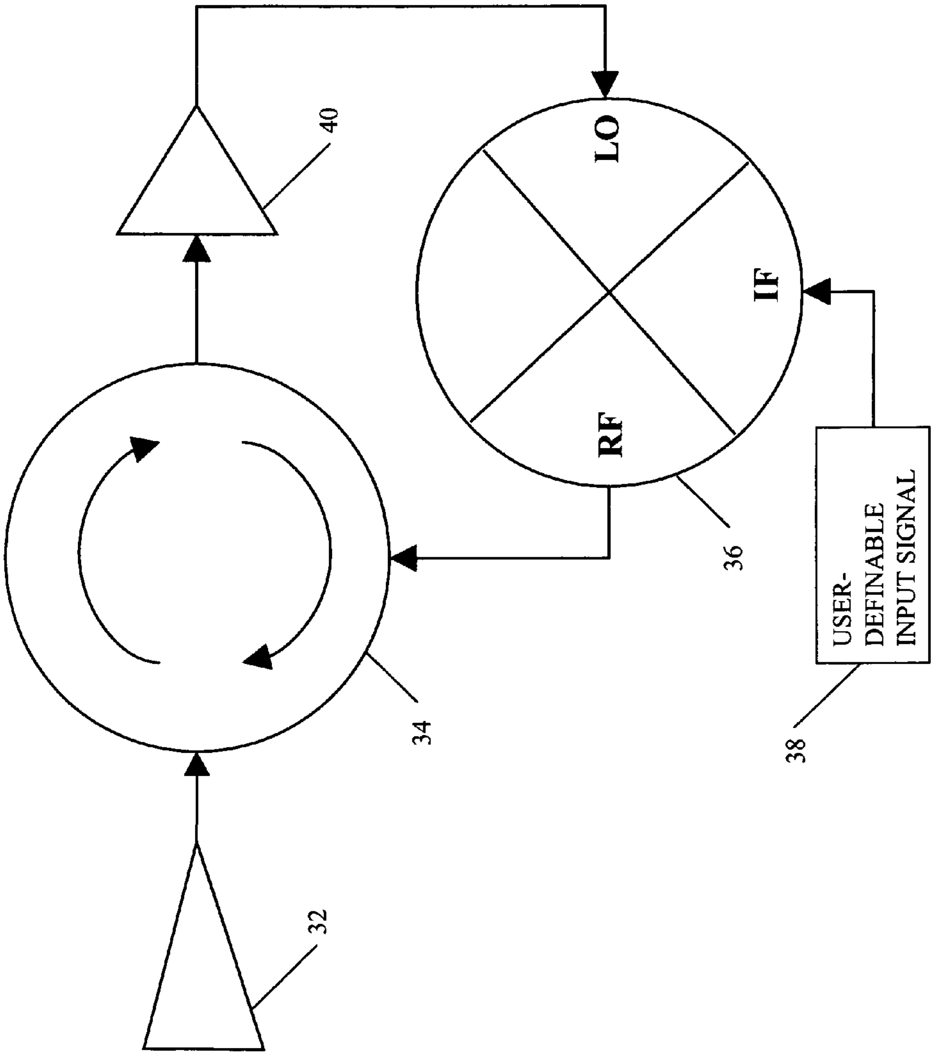
FIG. 3 is an alternate embodiment of the present invention.

In an alternate embodiment shown in FIG. 3, an antenna 32, a circulator 34, and a mixer 36 are used as described above, and an amplifier 40 is electrically connected between the second port of the circulator 34 and the LO of the mixer 36. The amplifier boosts the received radio wave LO signal before the signal is modulated at the mixer.

Figure 4:
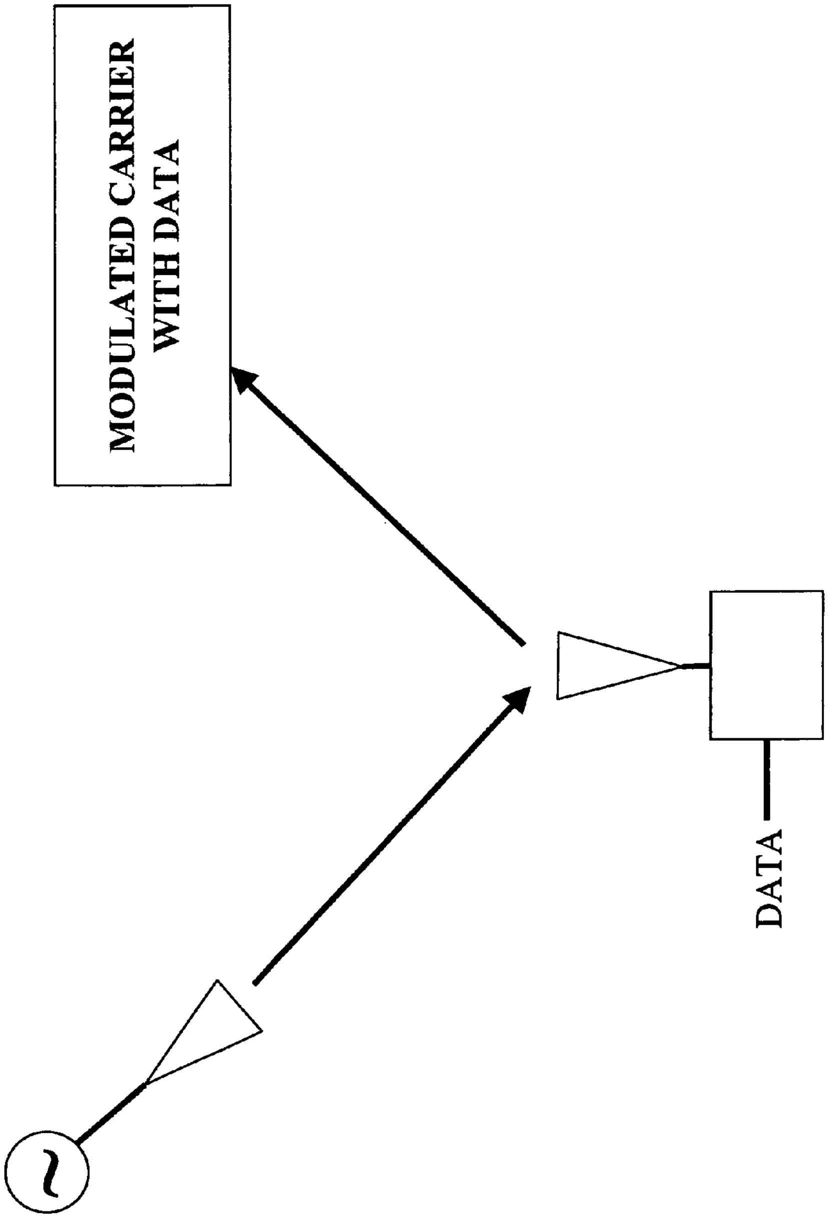
FIG. 4 is simplified plan view of the operation of the present invention.

As an example, operation of the embodiment shown in FIG. 3 is described. A continuous wave signal of frequency f illuminates the antenna 32 and enters the first port of the circulator 34. The circulator 34 preferentially routs the signal to the second port of the circulator 34. The signal is amplified by the amplifier 40, which has a gain G. The signal is routed to the local oscillator port of a biasable starved local oscillator mixer 36. The user-definable input signal 38 is routed to the IF port. The mixer 36 produces the sum and difference products f+IF and f−IF, the local oscillator signal feeds through to the RF port reduced by the mixer rejection and the IF in an analogous fashion into the third port of the circulator 34. The third port of the circulator 34 preferentially routes to the first port and is transmitted out by the antenna 32. This is illustrated in FIG. 4. Referring again to FIG. 3, the IF signal is significantly reduced in level by the insertion loss of the circulator 34 and the out of band characteristics of the antenna 32. The upper and lower sideband mixing products carry the information contained from the IF input.

While the preferred embodiments of the invention have been illustrated and described, it will be apparent to those of ordinary skill in the art that various changes and modifications may be made without deviating from the inventive concepts set forth above.

What is claimed is:

1. A wideband mixer-circulator retroreflector circuit, comprising:

a) an antenna, said antenna having an output;

b) a circulator, said circulator having a first port, a second port, and a third port, said first port electrically connected to the output of said antenna; and c) a mixer, said mixer having a first input, a second input, and an output, said first input electrically connected to the second port of said circulator, said second input electrically connected to a user-definable input signal, and said output electrically connected to the third port of said circulator.

2. The device of claim 1, further comprising an amplifier, said amplifier having an input and an output, said input electrically connected to the second input of said circulator, and said output connected to said first input of said mixer.

3. The device of claim 2, wherein said retroreflector antenna receives a signal in the range of the mixer and circulator frequency response.

4. The device of claim 3, wherein said retroreflector antenna receives a signal in the range of 1 GHz to 4 GHz.

5. The device of claim 4, wherein said user-definable input signal is a wideband signal with a minimum instantaneous bandwidth of 5 KHz to 500 MHz.

6. The device of claim 5, wherein said user-definable input signal modulates said signal to produce a modulated signal, said antenna retransmitting the modulated signal.

7. The device of claim 1, wherein said retroreflector antenna receives a signal in the range of the mixer and circulator frequency response.

8. The device of claim 1, wherein said retroreflector antenna receives a signal in the range of 1 GHz to 4 GHz.

9. The device of claim 1, wherein said user-definable input signal is a wideband signal with a minimum instantaneous bandwidth of 5 KHz to 500 MHz.

10. The device of claim 1, wherein said user-definable input signal modulates said signal to produce a modulated signal, said antenna retransmitting the modulated signal.

* * * * *